(12) United States Patent
Fowler et al.

(10) Patent No.: US 12,744,867 B2
(45) Date of Patent: Sep. 22, 2026

(54) SYSTEMS AND METHODS FOR CAPTURING IMAGE DATA FOR MAPPING

(71) Applicant: Exaactly Limited, Leeds (GB)

(72) Inventors: David Fowler, London (GB); Benjamin Richards, London (GB)

(73) Assignee: Exaactly Limited, Leeds (GB)

( * ) Notice: Subject to any disclaimer, the term of this patent is extended or adjusted under 35 U.S.C. 154(b) by 0 days.

(21) Appl. No.: 18/010,706

(22) PCT Filed: Jun. 16, 2021

(86) PCT No.: PCT/GB2021/051506
§ 371 (c)(1),
(2) Date: Dec. 15, 2022

(87) PCT Pub. No.: WO2021/255442
PCT Pub. Date: Dec. 23, 2021

(65) Prior Publication Data

US 2023/0239440 A1 Jul. 27, 2023

(30) Foreign Application Priority Data

Jun. 16, 2020 (GB) ..................................... 2009133

(51) Int. Cl.
*H04N 7/18* (2006.01)
*G01C 21/00* (2006.01)
(Continued)

(52) U.S. Cl.
CPC ......... *H04N 7/188* (2013.01); *G01C 21/3848* (2020.08); *G06V 20/56* (2022.01);
(Continued)

(58) Field of Classification Search
CPC ...... H04N 5/9201; H04N 23/61; H04N 23/64; H04N 9/8205; H04N 5/772; H04N 7/181;
(Continued)

(56) References Cited

U.S. PATENT DOCUMENTS

2013/0222369 A1 8/2013 Huston et al.
2016/0086036 A1* 3/2016 Kuroki ............... H04N 1/00323 348/135

(Continued)

FOREIGN PATENT DOCUMENTS

WO 2019023704 A1 1/2019

OTHER PUBLICATIONS

Wikipedia, "Google Street View," https://en.wikipedia.org/w/index.php?title=Google_Street_View&old id=960682340, Jun. 4, 2020, 12 pages.

(Continued)

*Primary Examiner* — Thai Q Tran
*Assistant Examiner* — Nienru Yang
(74) *Attorney, Agent, or Firm* — Berkeley Law & Technology Group, LLP

(57) ABSTRACT

A method of collecting visual data using a mobile image capture device is provided. The method comprises the steps of: capturing image data with the mobile image capture device and associating time and location data with each image; and storing the image data and associated time and location data. The method further comprises monitoring the position and orientation of the image capture device. The method further comprises: defining an area surrounding or next to the location of the mobile image capture device; and identifying a characteristic of the defined area based on one or more of: the density of the image data in the area; the age of the image data in the area; and/or data demand values associated with locations within the defined area. The timing of capture of image data is based on the characteristic of the defined area.

3 Claims, 1 Drawing Sheet

(51) Int. Cl.

| | |
|---|---|
| ***G06V 20/56*** | (2022.01) |
| ***H04N 5/92*** | (2006.01) |
| ***H04N 23/60*** | (2023.01) |
| ***H04N 23/61*** | (2023.01) |

(52) U.S. Cl.
CPC ........... *H04N 5/9201* (2013.01); *H04N 7/181* (2013.01); *H04N 23/61* (2023.01); *H04N 23/64* (2023.01)

(58) Field of Classification Search
CPC .... H04N 7/188; G01C 21/3848; G06V 20/56; G06F 16/587
USPC .......................................................... 348/143
See application file for complete search history.

(56) References Cited

U.S. PATENT DOCUMENTS

| | | | | |
|---|---|---|---|---|
| 2017/0131717 | A1* | 5/2017 | Kugelmass | H04W 4/025 |
| 2018/0259960 | A1* | 9/2018 | Cuban | G06V 20/53 |
| 2019/0163982 | A1* | 5/2019 | Block | G06N 5/022 |

OTHER PUBLICATIONS

Combined Search and Examination Report under Sections 17 and 18(3), App. No. GB2009133.6, mailed Nov. 13, 2020, 7 pages.
Notification of Transmittal of the International Search Report and the Written Opinion of the International Searching Authority, or the Declaration, App. No. PCT/GB2021/051506, mailed Nov. 26, 2021, 16 pages.

* cited by examiner

SYSTEMS AND METHODS FOR CAPTURING IMAGE DATA FOR MAPPING

The present invention relates to the capture of image data for building a map of the world.

Geo-located image data obtained in a formulaic way can assist with navigation. Some such systems are well known. For example, it is possible to switch to Street View using Google Maps and see images that were obtained by a camera at a particular location and orientation represented by an arrow on a map.

Such image data is typically collected by roof-mounted cameras on cars that drive around certain locations. However, the data is not always up-to-date and the capture of the data is not driven by relevant factors, such as real-time changes in the actual location being captured.

Moreover, the known sources of geo-located image data do not capture the data for any particular purpose. That is, it is not important what is in each captured image other than the fact that it resembles the location. In fact, geo-located image data is particularly beneficial in certain industries, which require specific items to be captured in the data. The capture of items within generic image databases is often not clear, and does not provide images of sufficient quality for the items of interest.

Moreover, existing databases are captured using dedicated vehicles that follow specific routes. The existing technologies are therefore inefficient compared with data capture on vehicles whose primary purpose may be to carry out other functions at the same time (e.g. deliveries to retail customer).

Accordingly, there is provided a method as set out in the appended claims.

DETAILED DESCRIPTION

Figure 1:
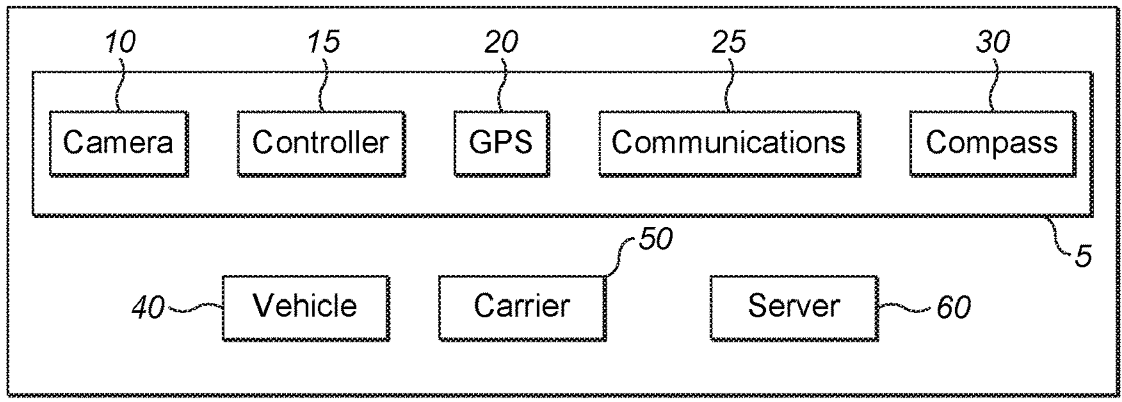
FIG. 1 is a schematic block diagram depicting an example system in accordance with one or more embodiments.
Figure 2:
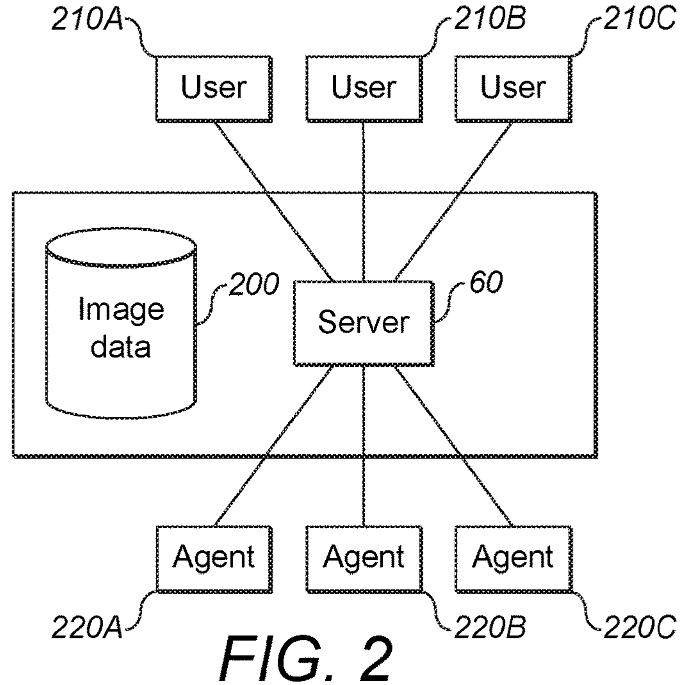
FIG. 2 is a schematic block diagram depicting another example system in accordance with one or more embodiments.
Figure 3:
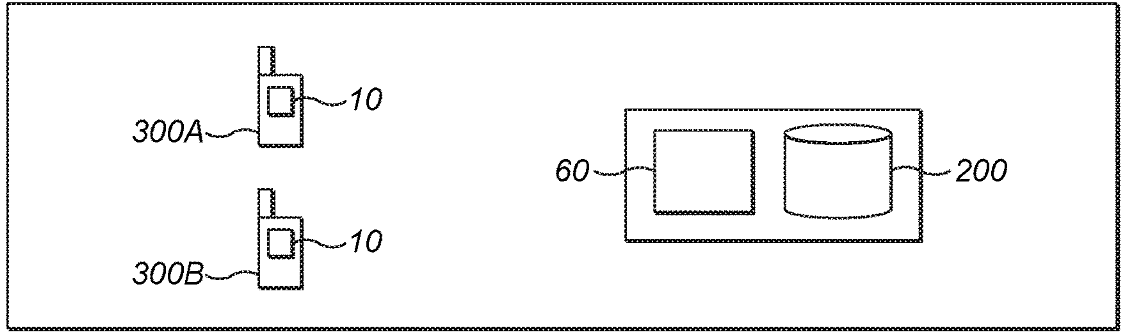
FIG. 3 is a schematic block diagram depicting another example system in accordance with one or more embodiments

For a better understanding of the invention and to show how the same may be put into effect, reference will now be made, by way of example only, to the accompanying drawings in which FIGS. 1 to 3 show schematic representations of parts of the disclosed system.

As shown in FIG. 1, an image capture device 5 that may be used in accordance with the following methods comprises a camera 10, a controller 15, a location determination device 20, such as a GPS module, and an orientation determining device 30 (which could be part of the location determining device), such as a compass. Optionally, the image capture device 5 comprises a communications module 25.

The image capture device 5 may be mounted on a vehicle 40 or carried by a person 50, perhaps in a harness or forming part of an item of clothing.

The controller 15 can store the captured image data along with associated time and location data (from the location determination device 20) for each image. Optionally, orientation data (from the orientation determining device 30) is also stored for each image. Ultimately, the captured image data is stored on a server 60. The controller 15 of the image capture device 5 may automatically transmit the captured images, along with the associated time, location and orientation data, to the server 60 via the communications module 25 in real time, or periodically. Alternatively, the image capture devices 5 may transmit the captured images, along with the associated time, location and orientation data, to the server 60 in response to user input. More simply, the operator may download the captured image data, along with the associated time, location and orientation data, from the image capture devices 5 and pass this to the server 60 in response to user input.

A first embodiment of a visual data collection method in accordance with the invention may be arranged to capture image data based on location and, optionally, also orientation. Although it is envisaged that a system will comprise a plurality of image capture devices 5, the following description describes the system with respect to only one of such devices.

For example, such a method can capture image data when a vehicle carrying the image capture device 5 is in a location of interest. The image capture device may have a camera 10 that captures a wide angle image, perhaps an image extending around 360 degrees. If not, it is possible to use the orientation determining device 30 in combination with the location determination device 20 to establish when the image capture device 5 is in a location of interest and when the camera 10 is directed at a scene of interest.

As a further example, the camera 10 may be controlled to capture images at a particular frequency that is determined automatically and varies based on location and, optionally, orientation.

As will be appreciated, while a vehicle carrying the image capture device 5 could be driven along a pre-determined route, in fact, the vehicle does not need to be driven in a manner optimised for capturing desired image data. The vehicle could be, for example, a taxi that follows a route determined by the desired destination of a passenger, or a bicycle ridden by a courier to a specific package drop-off point. Such routes would conventionally not be of use for capturing image data.

However, the controller 15 may be programmed to use the information from the location determination device 20 (and, optionally, the orientation determining device 30) to control when image data is captured by the camera 10, or to control the frequency at which image data is captured by the camera 10.

In this way, when the vehicle is determined by the location determination device 20 to be in a location for which image data is required (and preferably when the camera is pointed in the direction corresponding to a scene that is desired to be captured), the camera 10 can be activated to capture image data.

The option of modulating the frequency of image capture is important, because it may be that the camera is intended to capture image data continuously along the route, but in certain areas more dense information is required in order to obtain more image data relating to a particular scene.

The first embodiment may therefore comprise monitoring the location of the image capture device 5 using the location determination device 20. Preferably, the method comprises monitoring both the position and orientation of the image capture device.

This monitoring (location, or location and orientation) may be carried out locally by the controller 15. Alternatively, monitoring may be carried out remotely using the communications module 25, which transmits the location of the image capture device 5 to a remote server 60.

The initiation of image capture can be based on the monitored position and, when orientation is monitored, also on the monitored orientation.

That is, the image capture device 5 may automatically capture an image when the image capture device 5 is in a particular location and has a particular orientation.

The first embodiment may therefore further comprise capturing image data with the image capture device 5 at a sampling frequency. The sampling frequency may be varied automatically based on the current location of the image capture device 5 or based on the current location and orientation of the image capture device 5.

Each image is associated with time and location data representing when and where the image was captured. Preferably, each image is associated with orientation data representing the orientation of the camera 10 when the image was captured.

The image data and the associated time and location data (and the optional orientation data) are stored. The data may be stored locally on the image capture device 5. Alternatively, or in addition, the data may be transmitted by the communications module 25 and then stored remotely on the remote server 60.

The cumulative stored data thus provides a set of images associated with locations that can be plotted on a map.

The map can represent a one or more characteristics of the stored image data. The characteristics may be defined for an area of the map (for example, the map could be divided into an array of square areas) and include one or more of: the density of the image data for the area; the age of the image data in the area; and/or data demand values (described below) associated with one or more locations within the defined area.

Each area may have an associated density characteristic representing the density of the image data in that area. The density of image data can therefore be used to influence the capture of image data. When the images are sparse in a particular area, the image capture device 5 may be controlled to capture more data in that area. That new data may supplement the existing image data, so that the system automatically increases the image data towards a minimum desired value. For example, when the location of the image capture device 5 corresponds with an area of the map having an density below a threshold density, a sampling frequency of image capture may be increased. In a further example, a sampling frequency of image capture may be a function of the density characteristic.

Since the image data is associated with a particular time of image capture, it is possible to identify the age of images in a given area of the map. For example, each area may have an associated age characteristic equal to the average age of the image data captured for that area. The age of image data can therefore be used to influence the capture of image data. When the images are older than a threshold age, the image capture device 5 may be controlled to capture more data in that area. That new data may replace the existing image data, so that the system automatically refreshes the image data when possible. For example, when the location of the image capture device 5 corresponds with an area of the map having an age above a threshold age, a sampling frequency of image capture may be increased. In a further example, a sampling frequency of image capture may be a function of the age characteristic.

Certain areas of the map may be given a priority value. For areas with a higher priority value, the threshold age may be less than for areas with a lower priority value.

In other words, the sampling frequency may be increased in order to capture more image data in areas that may have recently captured image data but the area is a high priority area, and conversely the sampling frequency may be decreased in order to capture less image data in areas that may have aging captured image data but the area is a low priority area.

When new image data is captured for a particular location (and, optionally, orientation), it may be compared with old image data for that location (and, optionally, that orientation) to indicate that the area has changed. The sampling frequency may therefore be increased for that location (and, optionally, that orientation) so as to renew the image data. Optionally, when sufficient new image data has been captured for a particular location (and, optionally, orientation), the old image data or that location (and, optionally, orientation) may be removed.

As a further example, the method may be demand driven. Each area may have an associated demand value characteristic representing the level of demand for image data in that area. The demand for image data can be used to influence the capture of image data. When the demand value characteristic for a particular area is high, the image capture device 5 may be controlled to capture more data in that area. For example, when the location of the image capture device 5 corresponds with an area of the map having a demand value above a threshold demand, a sampling frequency of image capture may be increased. In a further example, a sampling frequency of image capture may be a function of the demand characteristic.

The demand value characteristic may be determined automatically based on publically available databases. Those databases may include one or more of: weather data or planning data. For example, a weather database may be used to identify when adverse weather events, (such as high winds, high rainfall or cold temperatures) may have caused a change in the environment. For example, flooding, wind, rain, etc. could damage items such as junction boxes being monitored by the system. Moreover, a planning database may be used to identify when large construction projects, or infrastructure modifications, have significantly changed the appearance of an area to a degree that indicates that the existing image data is no longer relevant.

As a further example, the method may be user demand driven. That is, a user may request extra image data, or new image data, for a particular region of the map. Multiple users may provide such requests so as to collectively define a level of demand for each area of the map. Thus, each area may have an associated demand value characteristic representing the level of demand for image data in that area. The demand for image data can therefore be used to influence the capture of image data. When the demand value characteristic for a particular area is high, the image capture device 5 may be controlled to capture more data in that area. For example, when the location of the image capture device 5 corresponds with an area of the map having a demand value above a threshold demand, a sampling frequency of image capture may be increased. In a further example, a sampling frequency of image capture may be a function of the demand characteristic.

As an alternative user demand example, the method may be demand driven based on particular classes of items in known locations. That is, a user may request image data for a particular class of items where the locations of each of a set of those items is known. Image capture may be triggered automatically when the monitored location of the image capture device 5 corresponds to the known locations. More preferably (e.g. if the camera does not have a 360 degree capture span), image capture may be triggered automatically when the monitored location of the image capture device 5 corresponds to the known locations and the monitored orientation indicates that the camera 10 is pointing at the item.

As a concrete, non-limiting example, one of many users may be a cable internet provider. The user may provide the locations of numerous above-ground junction boxes in a particular city, the condition of which needs to be monitored (other providers such as Google Maps may not provide suitable images for this). A plurality of image capture devices 5 may each be mounted on taxis, delivery vehicles, etc. that work in a particular city and that are independently operated and thus are directed by their own customers and so cover the map between them in a generally random fashion. The plurality of image capture devices 5 may be transported around the city and automatically capture images of the junction boxes whenever the determination is made that an image can be captured because the camera 10 is pointing at the location of one of the junction boxes. Similarly, the plurality of image capture devices 5 may be capturing images at a particular frequency, but increase the frequency whenever the determination is made that one of the junction boxes is near the image capture device 5.

With respect to the user demand driven method, this may be carried out with reference to visual data requests. A visual data request may include the locations of the items of interest. The locations may be specific, but this is not essential. The location may define an area in which the item is expected to be located. Optionally, the visual data request may include one or more images representing the appearance of items of a particular class (for example, junction boxes). The server 60 with which the image capture devices 5 may communicate via their respective communications modules 25 may receive the visual data requests from a plurality of users to define the data demand value characteristics for the map.

It may be the case that the stored image data already includes relevant image data, which may obviate the need for further capture. Accordingly, the server may be programmed to apply object recognition algorithms to the stored data, based on visual data requests that are provided with images representing the objects of interest.

The object recognition algorithm may be, for example, that described in "*A Decision-Theoretic Generalization of On-line Learning and an Application to Boosting*" by Yoav Freund and Robert E. Schapire (1997), published in Journal of Computer and System Sciences, 55(1):119-139, or that described in "*Improved Boosting Algorithms Using Confidence-Rated Predictors*" by Robert E. Schapire and Yoram Singer (1999), published in Machine Learning, 37(3):297-336.

The server 60 may generate an object recognition algorithm to detect a first type of item (i.e., train the algorithm based on training data from the visual data request). The type of item being one of the classes of item in a visual data request, for example a junction box.

The server 60 may apply the object recognition algorithm to the stored image data corresponding to the area in which the item is expected to be located or an area surrounding the location (i.e., from which it may be expected that a view of the item may be possible).

When an item of a particular class is detected in an image within the image data, the location data associated with that image can be used to identify the locations of the item (perhaps, only roughly) within the first area.

Demand value characteristics may therefore depend on the outcome of the object recognition algorithm.

For example, if no items of the first type are recognised within a first area, the demand value characteristic for that area may be higher than the demand value characteristic for a second area in which one or more items of the first type are recognised. The sampling frequency for the first area may therefore be greater than for the second area.

Multiple users may provide visual data requests, which collectively define a level of demand for each area of the map. The level of demand for each area may be modified based on the results of one or more object recognition algorithms applied to the existing stored image data and the location data associated therewith.

For example, the set of image data requests to be actioned may define a plurality of classes of items. The number of items of each class that are recognised within each area may be used to determine the demand value characteristic for that area, and thus define, at least in part, the sampling frequency for that area.

In a specific example, the server 60 may receive from each of a plurality of users an image data request, wherein each image data request defines a different type of item to be captured.

In some cases, a visual data request may not include specific locations of items, but be a general request for images of items of a particular type. For example, the visual data request may indicate for a given area a number of items of a particular type to be captured in that area.

In this case, the method may involve defining a first area as the particular area associated with the visual data request. One or more object detection algorithms may be employed to detect the items in the already stored image data, thereby identifying their locations. For the purpose of capturing image data, the demand value characteristics for different areas on the map may be based, at least in part, on the difference between the indication of the number of items of the first type to be found in the first area and the number of items of the first type detected within the first area.

The object detection algorithms and map discussed above can be used to identify missing data locations, i.e. locations without associated image data capturing images of one or more items of user-defined types.

Whereas, it is preferred that third parties are used to transport the mobile image capture devices 5, these will typically be driven in a manner unrelated to the aim of capturing image data. Accordingly, there is optionally provided a vehicle, preferably an autonomous vehicle such as a drone (for example, a self-driving car or unmanned aerial vehicle), on which a mobile image capture device 5 is mounted. The vehicle may be directed to the identified missing data locations to capture image data and associated location (and, optionally, orientation) data.

It is also envisaged that images could be captured by people carrying image capture devices 5. Human intervention can be particularly useful for capturing images that may be missed by vehicles. For example, image data of sufficient quality might not be obtainable from a vehicle which could be restricted to a road distant from the important part of a scene. The server may therefore be arranged to maintain a list of desired information.

A second embodiment of a visual data collection method in accordance with the invention may therefore use mobile image capture devices 5 carried by each of a plurality of agents 220 (individually, 220A, 220B, 220C) (these may be held in the hand; worn via harnesses or incorporated into clothing; or mounted on a vehicle such as a bicycle or car, etc.).

The second embodiment may be combined with the first embodiment, or may be employed independently thereof.

As can be seen from FIG. 2, the server 60 receives from each of a plurality of users 210 (individually, 210A, 210B, 210C) a request for image data. Each visual data request defines a particular type of item to be captured and is in respect of a particular area (such as a city, a road, a region defined by GPS coordinates, or even the entirety of the map).

The server 60 maintains an outstanding request database of requested image data not yet captured. Object detection algorithms trained to detect the particular type of item in image data may be employed to determine whether the previously captured stored image data already contains any data relevant to the request.

The plurality of agents 220 may each have an account on the server 60 to enable them to access the outstanding request database.

The plurality of agents 220, informed by the outstanding request database, then capture image data and associated location and orientation data with the mobile image capture devices 5 carried by each agent 220;

The plurality of agents 220 upload the captured images and associated location and orientation data to the image data store 200.

The server 60 monitors the image data uploaded to identify the items captured within the image data and thereby updates the outstanding request database.

In preferred embodiments, a profile may be stored for each of the agents 220. The profile may define the areas of the map for which each agent 220 is responsible. The server 60 may therefore generate a list of required items to be captured for a given area relevant to a particular agent 220A, 220B, 220C based on the stored profiles and the outstanding request database.

The list may be communicated to the respective agent 220A, 220B, 220C of the plurality of agents 220. The communication may be a result of the agents 220 accessing the list from the server 60, or the server 60 sending the list to the agents 220.

In order to motivate the agents 220, the server 60 may gamify the process.

Points may be associated with certain items, so that the agents 220 can score points for capturing images of the items. The image captures may be verified automatically using one or more object detection algorithm and the location and orientation data associated with the images.

The number of points for each item may be determined based on one or more of: the value of the image data to the operator of the server 60; the frequency at which the image data needs to be updated; the sparseness of the image data in the stored image data; etc.

The points may be redeemable by the agents 220. For example, the agents 220 may be paid for the image data in relation to the points, or the points may provide access to online services.

In a third embodiment of a visual data collection method in accordance with the invention, a navigation system may be provided. The third embodiment may optionally be combined with either or both of the first or second embodiments.

One of the problems with navigation systems, for example GPS navigation systems for driving, is that the accuracy of the destination location is often insufficient to direct the user to the actually intended end of the journey.

As a concrete, non-limiting example, a delivery driver may enter an address into a navigation system, which will direct the delivery driver to a rough location. When the navigation system concludes that the destination has been reached, the driver must search the nearby area to establish exactly the location to which an item must be delivered. The navigation system will typically be accurate enough that the delivery driver will be successful. However, time is lost in this process. Delivery drivers often have a tight schedule and cannot afford to lose time in this way too often.

As can be seen from FIG. 3, the third embodiment provides a method of capturing image data when a user, that has used a navigation system to roughly approach a destination, subsequently finds a destination. The captured image data can be used to inform the navigation of subsequent users to that destination In the third embodiment, a first navigation device 300A generates a route for travelling from a starting location to a destination location in the usual way. The end of the route typically will be an approximation of the destination location.

As is conventional, the first navigation device 300A displays the route to a first user, and tracks its own location as the user travels along the route. The first navigation device 300A may display its own location on the route. The first navigation device 300A identifies when the end of the route is approaching or has been reached.

At the destination location, the first user may search for the precise destination intended. Once the precise destination has been identified, the first user may capture an image relating to the destination location. The image may be a single image, or a sequence of images (e.g. a video), for assisting another user with finding the precise destination from the end of the route as directed by the navigation system.

A server 60 may store the image data, and associate it with the destination. Specifically, the navigation device 300A may be arranged to send the captured image data to the server 60.

In this way, when a second user wishes to navigate to the same destination, they will use a second navigation device 300B to generate a route from the same or another starting location to the destination location.

As with the first user, the second navigation device 300B presents the second user with a display of the route, and tracks its own location as the second user travels along the route. The second navigation device 300B may display its own location on the route. The second navigation device 300B identifies when the end of the route is approaching or has been reached.

In contrast to the use of the first navigation device 300B, however, when the end of the route is approaching or has been reached, the second navigation device 300B displays the image data captured by the first user to the second user.

There is also provided in a fourth embodiment in accordance with the invention, a navigation system. The fourth embodiment may optionally be combined with the third embodiment.

In the fourth embodiment, a navigation system includes a route generation method for the delivery of a plurality of items.

The method comprises providing the navigation system with a starting location and a plurality of delivery locations. Each of the delivery locations is associated with at least one of the plurality of items to be delivered.

The navigation system obtains traffic information for one or more areas encompassing the delivery locations.

The navigation system uses the traffic information to identify an order of the delivery locations to be visited to thereby identify a fastest delivery route.

The delivery route may be defined as extending from the starting location to the final delivery location, or to a further destination location (for example, returning to the starting location).

Thus, in contrast with existing navigation systems, the way points on the route may be ordered to find the fastest delivery route for the given traffic conditions, rather than the shortest route.

There is also provided in a fifth embodiment in accordance with the invention, a delivery management system. The fourth embodiment may optionally be combined with the third or fourth embodiments.

In the fifth embodiment, a delivery management system is used to modify the likelihood that particular delivery slots may be chosen by customers purchasing items. In this way, the customers can be motivated to choose delivery slots that enable more efficient despatching of items.

The method comprises, for each of a plurality of customers, receiving an order from the customer for the delivery of one or more items to a delivery location.

The delivery management system provides the customer with the option of a plurality of delivery time slots.

The delivery management system calculates a charge for each delivery time slot.

The charge for the delivery time slot may be chosen to improve the efficiency of a fleet of delivery vehicles. Given the items purchased, the capacity of the delivery vehicles in the fleet, and the destination locations, it is preferable that certain delivery slots are taken by users than others.

The charges for the deliveries may be varied based on the existing deliveries planned for the orders already received.

In a concrete, non-limiting example, if the set of orders currently received by the delivery management system may be effected by the delivery fleet being scheduled to follow a set of routes at a specific time, and a further customer requests a purchase of an item that may be delivered by one of the delivery vehicles of the fleet on one of the already scheduled routes, then a corresponding first delivery slot (the point at which the delivery vehicle is already scheduled to be near the delivery location) may be presented to the customer. A second delivery slot may be presented to the customer, but if this cannot be accommodated by the scheduled set of delivery routes, the cost of the second delivery slot would be higher than the cost of the first delivery slot. Moreover, the delivery management system may vary the cost of a delivery in order to dissuade customers from requesting the same delivery slot.

Historical data may be used to determine an expected plurality of delivery locations chosen by customers for each time slot of each day of the week based on previously recorded chosen delivery times. The historical data can be used to vary delivery charges for different time slots in order to reduce peak demand on the system and spread the deliveries over a range of time slots.

Accordingly, the charge for a delivery may be based at least in part on:

(a) the plurality of delivery locations already chosen by users for that delivery time slot;

(b) the existing planned deliveries for locations within a threshold distance of the delivery location during a time period including the time slot; and/or (c) an expected plurality of delivery locations chosen by users for that delivery time slot on that day of the week based on previously recorded chosen delivery times.

The invention claimed is:

1. A method of adding new image data to previously stored image data using a mobile image capture device, wherein the image data has associated therewith location data representing the location at which the image was taken, comprising the steps of:

defining a map of the stored image data using the associated location data;

generating a first object recognition algorithm based on training data from a visual data request to detect a first type of item;

applying the first object recognition algorithm to the stored image data to detect items of the first type and using the location data associated with the stored image data to identify the locations of items of the first type within the stored image data;

using the map and the identified locations to define missing data locations on the map, missing data locations being locations on the map without associated image data capturing images of the item of the first type, the method further comprising:

transporting the mobile image capture device to a missing data location;

capturing image data with the mobile image capture device and associating location data with each image; and storing the image data and associated location data.

2. A method of collecting visual data using mobile image capture devices carried by each of a plurality of agents, comprising the steps of:

receiving from each of a plurality of users a request for image data, wherein each image data request defines a particular type of item to be captured within the image data and is in respect of a particular area;

generating or loading a first object recognition algorithm to detect the type of item for that request;

applying the first object recognition algorithm to previously stored image data and using the associated location data to identify the locations of items of the first type within the stored image data, the previously stored image data captured before receipt of the image data request;

maintaining an outstanding request database of requested image data of the particular type of item and the particular area not yet captured based on the identified locations of items of the first type within the previously stored image data;

capturing image data and associated location and orientation data with the mobile image capture devices carried by each agent;

uploading the captured images and associated location and orientation data to an image data store;

monitoring the image data uploaded to identify the items captured within the image data and thereby update the outstanding request database;

generating one or more lists of required items to be captured for a given area based on the updated outstanding request database; and communicating at least one required item list to each of the plurality of agents, wherein each mobile image capture device is associated with a user corresponding to an agent, and the method further comprises allotting to a user account a number of points, wherein the number of points depends on a number and type of each item captured.

3. The method of claim 2, wherein the agent is an autonomous vehicle.

* * * * *